(12) United States Patent
French et al.

(10) Patent No.: US 7,129,009 B2
(45) Date of Patent: Oct. 31, 2006

(54) POLYMER-LIQUID COMPOSITIONS USEFUL IN ULTRAVIOLET AND VACUUM ULTRAVIOLET USES

(75) Inventors: Roger Harquail French, Wilmington, DE (US); Robert Clayton Wheland, Wilmington, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 111 days.

(21) Appl. No.: 10/474,280

(22) PCT Filed: May 14, 2002

(86) PCT No.: PCT/US02/18397

§ 371 (c)(1),
(2), (4) Date: Oct. 7, 2003

(87) PCT Pub. No.: WO02/092670

PCT Pub. Date: Nov. 21, 2002

(65) Prior Publication Data

US 2004/0137361 A1  Jul. 15, 2004

(51) Int. Cl.
*G03F 7/20*  (2006.01)
*G03B 27/00*  (2006.01)
*G02B 9/00*  (2006.01)
*C08K 5/02*  (2006.01)

(52) U.S. Cl. .................. 430/5; 355/18; 359/754; 428/522; 524/462; 524/795

(58) Field of Classification Search ................ 524/462, 524/795; 430/5; 359/754; 355/18; 428/522
See application file for complete search history.

(56) References Cited

U.S. PATENT DOCUMENTS

| | | | | |
|---|---|---|---|---|
| 3,462,401 | A | | 8/1969 | Kometani et al. |
| 3,616,371 | A | * | 10/1971 | Ukihashi et al. ............... 522/5 |
| 5,051,114 | A | * | 9/1991 | Nemser et al. ................ 95/47 |
| 5,182,342 | A | * | 1/1993 | Feiring et al. .............. 526/206 |
| 5,356,668 | A | | 10/1994 | Paton et al. |
| 5,760,139 | A | | 6/1998 | Koike et al. |
| 5,853,894 | A | | 12/1998 | Brown |
| 5,883,177 | A | * | 3/1999 | Colaianna et al. .......... 524/462 |
| 6,156,389 | A | | 12/2000 | Brown et al. |
| 6,156,824 | A | * | 12/2000 | Yamada et al. ............. 523/462 |
| 6,203,912 | B1 | * | 3/2001 | Watakabe et al. ........... 428/421 |
| 6,248,823 | B1 | * | 6/2001 | Hrivnak et al. ............. 524/462 |
| 6,548,129 | B1 | * | 4/2003 | Matsukura et al. .......... 428/14 |
| 6,706,796 | B1 | * | 3/2004 | Rao et al. ................... 524/463 |
| 2002/0065383 | A1 | * | 5/2002 | Maccone et al. ........... 526/247 |
| 2003/0026574 | A1 | * | 2/2003 | Suzuki et al. ............... 385/129 |

(Continued)

FOREIGN PATENT DOCUMENTS

DE  196 40 972  4/1998

(Continued)

OTHER PUBLICATIONS

Switkes et. al., Immersion Lithography Beyond the 65 NM Node with Optics, Microlithography, 2003, pp. 4-6, 18 and 20, Massachusetts.

(Continued)

*Primary Examiner*—Richard L. Schilling

(57) ABSTRACT

This invention relates to a fluoropolymer nanocomposite comprising a fluoropolymer phase and an inorganic oxide phase dispersed throughout, said inorganic oxide phase having either no particles or particles substantially all of which have a particle size of less than about 75 nm which can be determined by small angle x-ray scattering and transmission electron microscopy techniques. These nanocomposites are useful as protective coatings.

32 Claims, 7 Drawing Sheets

U.S. PATENT DOCUMENTS

2004/0030074 A1* 2/2004 Tsuda et al. ............... 526/206

FOREIGN PATENT DOCUMENTS

| EP | 0 584 703 | | 3/1994 |
|----|-----------|---|--------|
| EP | 0 676 458 | | 10/1995 |
| EP | 0 889 066 | | 1/1999 |
| EP | 0 889 067 | | 1/1999 |
| EP | 0 889 092 | | 1/1999 |
| EP | 0 907 088 | | 4/1999 |
| JP | 2-129254 | | 5/1990 |
| JP | 11-209685 | | 3/1999 |
| WO | WO 94/05498 | | 3/1994 |
| WO | WO 96/24625 | * | 8/1996 |
| WO | WO 96/34052 | | 10/1996 |
| WO | WO 97/01599 | | 1/1997 |
| WO | WO 97/11134 | | 3/1997 |
| WO | WO 00/01758 | | 1/2000 |
| WO | WO 01/85811 | | 11/2001 |
| WO | WO 02/44226 | | 6/2002 |

OTHER PUBLICATIONS

Switkes, Resolution Enhancement of 157 NM Lithography by Liquid Immersion, Proceedings of SPIE, 2002, pp. 459-465, vol. 4691, Massachusetts.

Switkes et. al., Immersion Liquids for Lithography in the Deep Ultraviolet, Proceedings of SPIE, 2003, pp. 690-699, vol. 5040, Massachusetts.

Albrecht, VUV Absorbing Vapours in N-perfluorocarbons, European Organization for Nuclear Research, 2002, pp. 1-14.

Seki et. al., Electronic Structure of Poly(Tetrafluoroethylene) Studied by UPS, VUV Absorption and Brand Calculations, Physica Scripta, 1990, pp. 187-171, vol. 41, Japan.

Belanger et. al., The Far Ultraviolet Spectra of Perfluoro-Normal-Paraffins, Chemical Physics Letters, 1969, pp. 649-651, vol. 3, No. 5, Canada.

Lombos et. al., The Electronic Spectra of Normal Paraffin Hydrocarbons, Chemical Physics Letters, 1967, pp. 42-43, vol. 1, Amsterdam.

* cited by examiner

POLYMER-LIQUID COMPOSITIONS USEFUL IN ULTRAVIOLET AND VACUUM ULTRAVIOLET USES

FIELD OF THE INVENTION

This invention concerns compositions comprising fluorinated polymers and fluorinated liquids, said compositions useful in the manufacture of articles substantially transparent to ultraviolet radiation at wavelengths from approximately 150 nanometer to 200 nanometers.

TECHNICAL BACKGROUND OF THE INVENTION

The semiconductor industry is the foundation of the trillion dollar electronics industry. The semiconductor industry continues to meet the demands of Moore's law, whereby integrated circuit density doubles every 18 months, in large part because of continuous improvement of optical lithography's ability to print smaller features on silicon. The circuit pattern is contained in the photomask, and an optical stepper is used to project this mask pattern into the photoresist layer on the silicon wafer. 157 nm lies in the region of the spectrum referred to as the vacuum uv (VUV), which range extends from 186 nm down to below 50 nm. Use of this VUV lithography requires materials transparent in this range.

WO 9836324 discloses the use of resins consisting solely of C and F, optionally in combination with silicone polymers having siloxane backbones, as pellicle membranes having an absorbance/micrometer of 0.1 to 1.0 at UV wavelengths from 140 to 200 nm.

French et al, WO 0137044 and WO 0137043 disclose vacuum ultraviolet (VUV) transparent materials exhibiting an absorbance/micron (A/micrometer) $\leq 1$ at wavelengths from 140–186 nm.

SUMMARY OF THE INVENTION

This invention provides a fluoropolymer composition comprising vinyl fluoropolymers and a liquid selected from the group consisting of i) cyclic, linear, or branched hydrofluorocarbons having 2 to 10 carbon atoms wherein said hydrofluorocarbon the number of fluorines equals or exceeds the number of hydrogens, no more than two adjacent carbon atoms are bonded to hydrogen, no more than six adjacent carbon atoms are bonded to fluorine, there are no —$CH_2CH_3$ groups, and any rings are five-membered or larger;

ii) X—$R_f^a[OR_f^b]nOR_f^c$Y wherein X and Y are independently hydrogen or fluorine and $R_f^a$, $R_f^b$, and $R_f^c$ are independently 1 to 3 carbon fluorocarbon or hydrofluorocarbon groups, linear or branched, wherein there are more fluorines than hydrogens and no more than two adjacent carbon atoms bonded to hydrogen;

iii) $C_nF_{2n-y+1}H_y$ wherein n=2 to 10, the number of fluorines equals or exceeds the number of hydrogens, no more than two adjacent carbon atoms are bonded to hydrogen, no more than six adjacent carbon atoms are bonded to fluorine, and there are no —$CH_2CH_3$ groups;

iv) $C_nF_{2n+1}CFHCFHC_mF_{2m+1}$ where n and m run from 1 to 4;

v) $X(CF_2CH_2)_nY$ where n=1 to 5, where X and Y are, independently, H, Cl, or F;

vi) $F[CF(CF_3)CF_2O]_nCFHCF_3$ where n=1 to 5;

vii) $F[CF(CF_3)CF_2O]_nCF_2CF_3$ where n=1 to 5;

viii) $HCF_2(OCF_2)_n(OCF_2CF_2)_mOCF_2H$ where n+m=1 to 8; and ix) $XR_fOCH_2CH_2OR_fY$, where X and Y are, independently, H, or F, $R_f$ is a $C_nF_{2n}$ fluorocarbon group wherein n=1 to 6.

Further provided is a method comprising causing a source to emit electromagnetic radiation in the wavelength range from 150 nanometers to 260 nanometers; disposing a target surface in the path of at least a portion of said electromagnetic radiation in such a manner that at least a portion of said target surface will be thereby illuminated; and interposing in the path of at least a portion of said electromagnetic radiation between said target surface and said source a shaped article comprising a vinyl fluoropolymer and a liquid said liquid being selected from the group consisting of i) cyclic, linear, or branched hydrofluorocarbons having 2 to 10 carbon atoms wherein said hydrofluorocarbon the number of fluorines equals or exceeds the number of hydrogens, no more than two adjacent carbon atoms are bonded to hydrogen, no more than six adjacent carbon atoms are bonded to fluorine, there are no —$CH_2CH_3$ groups, and any rings are five-membered or larger;

ii) X—$R_f^a[OR_f^b]nOR_f^c$Y wherein X and Y are independently hydrogen or fluorine and $R_f^a$, $R_f^b$, and $R_f^c$ are independently 1 to 3 carbon fluorocarbon or hydrofluorocarbon groups, linear or branched, wherein there are more fluorines than hydrogens and no more than two adjacent carbon atoms bonded to hydrogen;

iii) $C_nF_{2n-y+1}H_y$ wherein n=2 to 10, the number of fluorines equals or exceeds the number of hydrogens, no more than two adjacent carbon atoms are bonded to hydrogen, no more than six adjacent carbon atoms are bonded to fluorine, and there are no —$CH_2CH_3$ groups;

iv) $C_nF_{2n+1}CFHCFHC_mF_{2m+1}$ where n and m run from 1 to 4;

v) $X(CF_2CH_2)_nY$ where n=1 to 5, where X and Y are, independently, H, Cl, or F;

vi) $F[CF(CF_3)CF_2O]_nCFHCF_3$ where n=1 to 5;

vii) $F[CF(CF_3)CF_2O]_nCF_2CF_3$ where n=1 to 5;

viii) $HCF_2(OCF_2)_n(OCF_2CF_2)_mOCF_2H$ where n+m=1 to 8; and ix) $XR_fOCH_2CH_2OR_fY$, where X and Y are, independently, H, or F, $R_f$ is a $C_nF_2$n fluorocarbon group wherein n=1 to 6.

Further provided in the present invention is an apparatus comprising an activateable source of electromagnetic radiation in the wavelength range of 150–260 nanometers; and a shaped article comprising a vinyl fluoropolymer and a liquid said liquid being selected from the group consisting of i) cyclic, linear, or branched hydrofluorocarbons having 2 to 10 carbon atoms wherein said hydrofluorocarbon the number of fluorines equals or exceeds the number of hydrogens, no more than two adjacent carbon atoms are bonded to hydrogen, no more than six adjacent carbon atoms are bonded to fluorine, there are no —$CH_2CH_3$ groups, and any rings are five-membered or larger;

ii) X—$R_f^a[OR_f^b]nOR_f^c$Y wherein X and Y are independently hydrogen or fluorine and $R_f^a$, $R_f^b$, and $R_f^c$ are independently 1 to 3 carbon fluorocarbon or hydrofluorocarbon groups, linear or branched, wherein there are more fluorines than hydrogens and no more than two adjacent carbon atoms bonded to hydrogen;

iii) $C_nF_{2n-y+1}H_y$ wherein n=2 to 10, the number of fluorines equals or exceeds the number of hydrogens, no more than two adjacent carbon atoms are bonded to hydrogen, no more than six adjacent carbon atoms are bonded to fluorine, and there are no —CH$_2$CH$_3$ groups;

iv) C$_n$F$_{2n+1}$CFHCFHC$_m$F$_{2m+1}$ where n and m run from 1 to 4;

v) X(CF$_2$CH$_2$)$_n$Y where n=1 to 5, where X and Y are, independently, H, Cl, or F;

vi) F[CF(CF$_3$)CF$_2$O]$_n$CFHCF$_3$ where n=1 to 5;

vii) F[CF(CF$_3$)CF$_2$O]$_n$CF$_2$CF$_3$ where n=1 to 5;

viii) HCF$_2$(OCF$_2$)$_n$(OCF$_2$CF$_2$)$_m$OCF$_2$H where n+m=1 to 8; and ix) XR$_f$OCH$_2$CH$_2$OR$_f$Y, where X and Y are, independently, H, or F, R$_f$ is a C$_n$F$_{2n}$ fluorocarbon group wherein n=1 to 6.

DETAILED DESCRIPTION OF THE INVENTION

Figure 1:
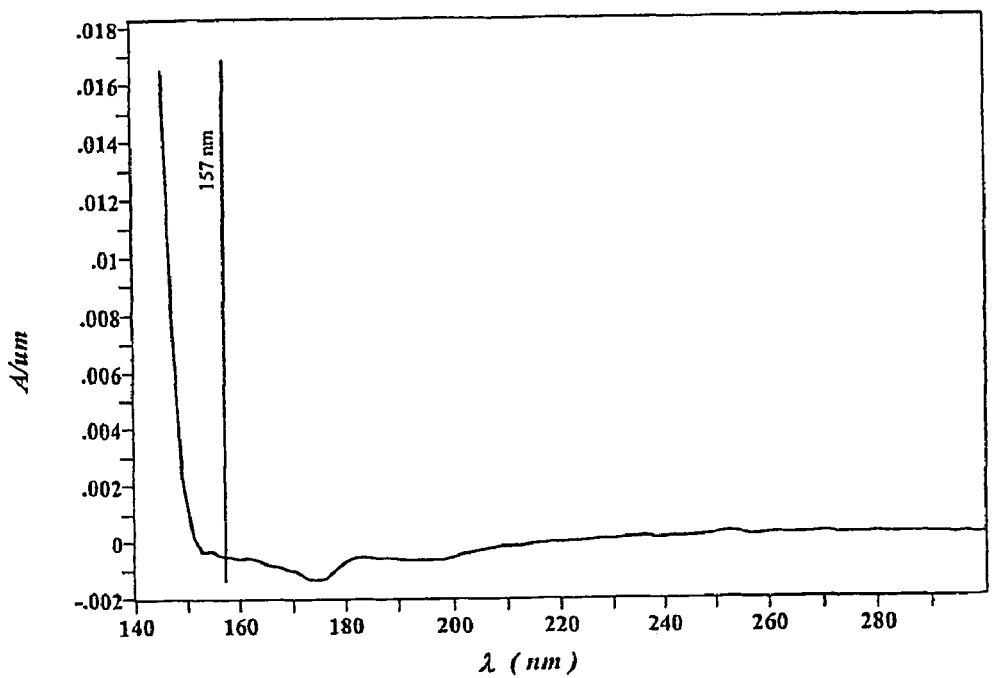
FIG. 1 describes the absorbance in units of inverse micrometers for CF$_3$CFHCFHCF$_2$CF$_3$, Vertrel™ XF versus wavelength lambda ($\lambda$) in units of nanometers.
Figure 2:
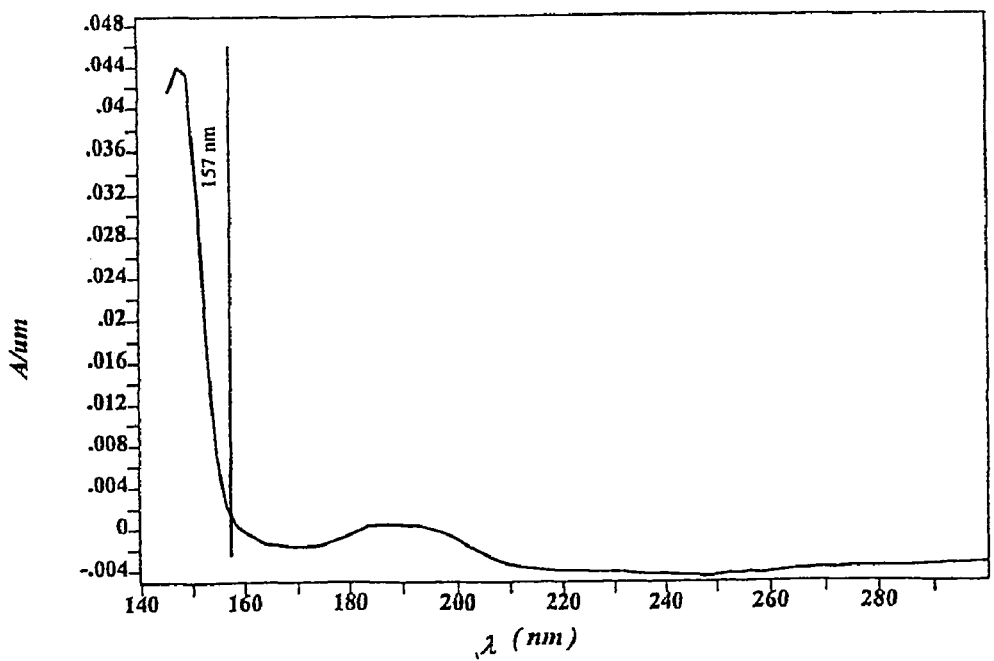
FIG. 2 describes the absorbance in units of inverse micrometers for CF$_3$CH$_2$CF$_2$CH$_3$, Solkane™ 365 mfc versus wavelength lambda ($\lambda$) in units of nanometers.

For the purposes of the present invention the term "solvent" is employed to mean a liquid medium in which a fluorinated polymer is dissolved or dispersed. The term "solvent" is also taken to mean a liquid which may be incorporated into a polymer and which has the effect of plasticizing the polymer.

The term "fluorinated" is employed to mean both partially or fully fluorinated; that is to say, the term "fluorinated" encompasses both hydrofluorocarbons and perfluorocarbons.

The term "amorphous" is employed to mean exhibiting no endotherm of greater magnitude than 1 joule/gram, in differential scanning calorimetry (DSC) according to ASTMI D4591-01. A "crystalline" polymer, by contrast, exhibits a melting endotherm of greater than 5 joules/gram in the same test.

It is well-known in the art to employ fluorinated polymers in the formation of shaped articles employed in various applications requiring high transparency, such as spectroscopy, microscopy, and photolithography where the light source is in the ultraviolet region. For example, a fluorinated polymer may be in the form of a film or coating which has been deposited from a solution or dispersion of the polymer. In certain cases, it can be very difficult to remove all traces of the solvent from the resultant polymer film or coating. There can be as much as 10% by weight of solvent remaining in the polymeric film or coating during use. As commercial interest shifts towards the use of shorter wavelengths lying in the so-called vacuum ultraviolete (VUV), such as in 157 nm photolithography, the problem of identifying polymers and solvents with sufficient transparency looms large. In particular, numerous solvents which are useful in photolithographic applications at longer wavelengths, are found to be highly absorbing at the shorter wavelengths in the 140–286 nm range of interest herein. There is a need to find solvents which are highly transparent in the wavelength range of 140–286 nm.

In one embodiment, this invention provides a composition comprising a vinyl fluoropolymer and a liquid selected from the group consisting of i) cyclic, linear, or branched hydrofluorocarbons having 2 to 10 carbon atoms wherein said hydrofluorocarbon the number of fluorines equals or exceeds the number of hydrogens, no more than two adjacent carbon atoms are bonded to hydrogen, no more than six adjacent carbon atoms are bonded to fluorine, there are no —CH$_2$CH$_3$ groups, and any rings are five-membered or larger;

ii) X—R$_f^a$[OR$_f^b$]nOR$_f^c$Y wherein X and Y are independently hydrogen or fluorine and R$_f^a$, R$_f^b$, and R$_f^c$ are independently 1 to 3 carbon fluorocarbon or hydrofluorocarbon groups, linear or branched, wherein there are more fluorines than hydrogens and no more than two adjacent carbon atoms bonded to hydrogen;

iii) C$_n$F$_{2n-y+1}$H$_y$ wherein n=2 to 10, the number of fluorines equals or exceeds the number of hydrogens, no more than two adjacent carbon atoms are bonded to hydrogen, no more than six adjacent carbon atoms are bonded to fluorine, and there are no —CH$_2$CH$_3$ groups;

iv) C$_n$F$_{2n+1}$CFHCFHC$_m$F$_{2m+1}$ where n and m run from 1 to 4;

v) $X(CF_2CH_2)_nY$ where n=1 to 5, where X and Y are, independently, H, Cl, or F;

vi) $F[CF(CF_3)CF_2O]_nCFHCF_3$ where n=1 to 5;

vii) $F[CF(CF_3)CF_2O]_nCF_2CF_3$ where n=1 to 5;

viii) $HCF_2(OCF_2)_n(OCF_2CF_2)_mOCF_2H$ where n+m=1 to 8; and ix) $XR_fOCH_2CH_2OR_fY$, where X and Y are, independently, H, or F, $R_f$ is a $C_nF_{2n}$ fluorocarbon group wherein n=1 to 6.

There is no limitation to the vinyl fluoropolymer suitable for use in the practice of the invention. One of skill in the art will be aware of a large number of such polymers employed in UV applications, most particularly photolithography. One of skill in the art will appreciate that the spectroscopic transmittance at the wavelength of interest will vary considerably from one polymer to another, and that a polymer which may be preferred at one wavelength may be less preferred at another while both said wavelengths fall within the range of 140–286 nm. One of skill in the art will further appreciate that the thermomechanical properties of a polymer are also important, and that the choice of any particular polymer and polymer/solvent combination will likely represent a tradeoff involving the many properties of the suitable polymer compositions.

Both crystalline and amorphous polymers are suitable for the practice of the present invention. However, from the standpoint of image transmission as in photolithography, amorphous polymers are preferred because of reduced light scattering. In other applications, where diffuse transmission may be preferred, such as in illumination of a surface undergoing microscopic examination, crystalline polymers, which in general exhibit superior thermomechanical properties, are preferred. While the principal focus in the present invention is photolithography at 157 nm, the inventors hereof contemplate quite wide applicability of the compositions, methods, and apparati encompassed by the instant invention.

The combination of the liquid of the invention as herein defined with any vinyl fluoropolymer suitable for use in any specific application will provide the desired benefit of the present invention, namely the near-elimination of the contribution to absorption from the liquid component of the polymer-liquid mixture.

Preferred fluoropolymers are amorphous fluoropolymers which include:

perfluoro-2,2-dimethyl-1,3-dioxole or $CX_2=CY_2$, where X is —F or —$CF_3$ and Y is H; copolymers of perfluoro-2,2-dimethyl-1,3-dioxole and $CX_2CY_2$ which copolymer may further comprise up to 25 mole % of one or more monomers $CR^aR^b=CR^cR^d$ randomly incorporated thereinto wherein each of $R^a$, $R^b$, and $R^c$ is independently H or F, and wherein $R^d$ is selected from the group consisting of —F, —$CF_3$, —$OR_f$ where $R_f$ is $C_nF_{2n+1}$ with n=1 to 3, and —OH with the proviso that when $R_f$ is —OH, $R^C$ is H.

Said copolymer of perfluoro-2,2-dimethyl-1,3-dioxole and $CX_2=CY_2$ may further comprise 40 to 60 mole % of one or more monomers $CR^aR^b=CR^cR^d$ incorporated thereinto in a non-random approximately alternating fashion wherein each of $R^a$, $R^b$, and $R^c$ is independently H or F, and where $R^d$ is selected from the group consisting of —F, —$CF_3$, —$OR_f$ where $R_f$ is $C_nF_{2n+1}$ with n=1 to 3, and —OH with the proviso that when $R_f$ is —OH, $R^C$ is H.

Amorphous fluoropolymers preferred for the practice of the invention further include a homopolymer selected from group A or copolymers from groups B, C, and D wherein group A consists of the homopolymer of $CH_2=CFCF_3$;

group B consists of copolymers comprising >25 mole % of monomer units derived from $CF_2=CHOR_f$ in combination with monomer units derived from vinylidene fluoride wherein $R_f$ is a linear or branched C1 to C6 fluoroalkyl radical having the formula $C_nF_{2n-y+1}H_y$ wherein the number of hydrogens is less than or equal to the number of fluorines, no more than two adjacent carbons atoms are bonded to hydrogens, and ether oxygen can replace one or more of the carbons providing at least one of the carbons adjacent to any ether oxygen is perfluorinated;

group C consists of copolymers comprising >10 mole % of monomer units derived from $CH_2=CFCF_3$, $CF_2=CHOR_f$, or a mixture thereof in combination with a monomer unit derived from 1,3 perfluorodioxoles wherein $R_f$ is a linear or branched C1 to C6 fluoroalkyl radical having the formula $C_nF_{2n}$-$C_nF_{2n-y+1}H_y$ wherein the number of hydrogens is less than or equal to the number of fluorines, no more than two adjacent carbons atoms are bonded to hydrogens, and ether oxygen can replace one or more of the carbons providing at least one of the carbons adjacent to any oxygen is perfluorinated, and wherein said 1,3-perfluorodioxole has the structure

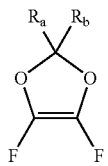

wherein $R_a$ and $R_b$ are independently F or linear —$C_nF_{2n+1}$, optionally substituted by ether oxygen, for which n=1 to 5;

group D consists of copolymers comprising 40 to 60 mole % of monomer units derived from a monomer represented by the formula

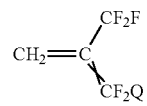

in combination with monomer units derived from vinylidene fluoride and or vinyl fluoride wherein g and Q are independently F (but not both F), H, $R_f$, or —$OR_f$ wherein $R_f$ is a linear or branched C1 to C5 fluoroalkyl radical having the formula

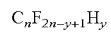

$C_nF_{2n-y+1}H_y$ wherein the number of hydrogens is less than or equal to the number of fluorines, no more than two adjacent carbons atoms are bonded to hydrogens and ether oxygen can replace one or more of the carbons providing that at least one of the carbons adjacent to any ether oxygen is perfluorinated.

More preferred are amorphous fluoropolymers which exhibit A ($\mu m^{-1}$) of 0.03, including poly(vinylidene fluoride/hexafluoropropylene), with a molar concentration of VF2 monomer units in the range of 75 to 80%; poly(vinylidene fluoride/perfluorodimethyldioxole), with a molar concentration of VF2 monomer units in the range of 50 to 70%; poly(vinylidene fluoride/perfluoromethylvinyl ether)), with a molar concentration of VF2 monomer units in the range of 60 to 80%; poly(trifluoroethylene/perfluorodimethyidioxole)), with a molar concentration of trifluoroethylene monomer units in the range of 45–55%; poly(hexafluoroisobutylene/vinylfluoride)), with a molar concentration of hexafluoroisobutylene monomer units in the range of 45–55%; poly(hexafluoroisobutylene/trifluoroethylene), with a molar concentration of hexafluoroisobutylene monomer units in the range of 45–55%; poly[vinylidene fluoride/CH2=C(CF3)CF2OCH(CF3)2], with a molar concentration of VF2 monomer units in the range of 45 to 60%; poly[vinylidene fluoride/CH2=C(CF3)CF2OCF(CF3)2]], with a molar concentration of VF2 monomer units in the range of 45 to 60%; poly[vinylidene fluoride/CF2=CHOCF2CF2H], ], with a molar concentration of VF2 monomer units in the range of 45 to 60%; poly(perfluorodimethyldioxole/CF2=CHOCF2CF2CF2CF3), ], with a molar concentration of PDD monomer units in the range of 50 to 80%; poly(CH2=CFCF2); poly(perfluorodimethydioxole/CH2=CFCF3), ], with a molar concentration of CH2=CFCF3 monomer units >50%.

The composition of the invention is useful for forming pellicles, lenses, light guides, anti-reflective coatings and layers, windows, protective coatings, and adhesives. This invention provides polymer-liquid compositions useful for the spin-coating, precipitation, and handling of polymers such that even were up to 10% of the processing liquids left as a residue in the polymer, after bulk liquid removal, the residual liquid would contribute minimally to absorption in the vacuum ultraviolet at wavelengths from 150 to 286 nm.

In one embodiment of the invention, the composition herein is employed in a pellicle film useful in 157 nm photolithography for the purpose of preparing electronic circuits. In a typical application a preferred polymer for the practice of the present invention is spin coated onto a glass or silica substrate. As spun, the pellicle film can contain up to 10 wt % residual solvent. In a typical commercial process in the electronics industry excess solvent is removed by baking. However this is not effective in removing all solvent, and can damage the thin pellicle film-typically 0.8 micrometers in thickness.

It is the goal of the present invention to provide solvents for use in combination with vinyl fluoropolymers for the preparation of shaped articles of high utility in applications involving 157 nm radiation. As one criterion for such utility, it is desired to provide solvents which can be present at a concentration of 10% by weight in a polymer film of a thickness of 1 micrometer said solvent causing a decrease in optical transmission of said film by no more than 1 percentage point vs. 100% transmission. This criterion translates into a requirement that a solvent suitable for the practice of the present invention must exhibit an absorbance in units of inverse micrometers ($\mu m^{-1}$) of $A/\mu < \sim 0.044$ in the wavelength range of 150 to 200 nm. For ease of handling, preferred liquids exhibit a boiling point in the range of −40 to 200° C., preferably from 50 to 180° C., most preferably from 100 to 150° C.

Many solvents known in the art, such as FC-40, Novec® HFE-7500, hexafluoropropylene/propylene cyclic dimer, and hexafluorobenzene, to be useful in forming spin-coating solutions of fluoropolymers employed for pellicle films exhibit unacceptably high levels of absorbance at 157 nm. The inventors hereof have discovered that certain solvents known in the art for their utility in applications unrelated to those herein, exhibit high transparency in the wavelength range of 150–200 nm, making them highly suitable for use in the preparation of shaped articles useful in the applications herein. Table 1 below shows transparencies measured for a number of fluorocarbon liquids.

These liquids should have a boiling point from −40 to 200° C., preferably from 50 to 180° C., most preferably from 100 to 150° C.

Solvents preferred for the practice of the present invention include $F(CF_2)_n CFHCFH(CF_2)_m F$ wherein n and m are independently 1 to 4, $CF_3(CH_2CF_2)_n CH_3$ wherein n=1 to 4, $HCF_2O(CF_2O)_n(CF_2CF_2O)_m CF_2H$ (with a boiling point falling in the range of 60 to 160° C.), $CF_3CF_2CF_2O[CF(CF_3)CF_2O]_n OCFHCF_3$, wherein n=0 to 3, $F(CF_2)_n F$ wherein n=6 to 8, and $X(CF_2)_m OCH_2CH_2O(CF_2)_n Y$ wherein m and n are independently 1 to 4 and X and Y are independently H and F. Most preferred are $CF_3CFHCFHCF_2CF_3$, $CF_3CH_2CF_2CH_3$, $HCF_2O(CF_2O)_n(CF_2CF_2O)_m CF_2H$ (with a boiling point falling in the range of 80 to 140° C.), $CF_3CF_2CF_2OCFHCF_3$, $CF_3CF_2CF_2OCF(CF_3)CF_2OCFHCF_3$, $F(CF_2)_6 F$, and $F(CF_2)_8 F$.

The compositions of the present invention are useful, depending on concentration and properties of the polymer in the solution or dispersion hereof, in the fabrication of sheets, layers, coatings, films of UV transparent material which are in turn used in optical applications in pellicles, lenses, light guides, anti-reflective coatings and layers, windows, protective coatings, and glues where light absorption is required to be low.

The compositions of the present invention may conveniently be prepared by cryogenically grinding the polymer to a powder and then adding the thus ground polymer to the solvent while stirring to form a solution of about 30% solids for the purpose of forming a shaped article or coating. After the formation thereof, the thus formed article may be subject to heating and/or vacuum to remove residual solvent. According to the present invention, it may be found convenient to allow as much as 10% by weight of solvent to remain in the shaped article because it will have negligible effect on the transmission of the thus formed shaped article.

In a further embodiment, the present invention provides a method comprising causing a source to emit electromagnetic radiation in the wavelength range from 150 nanometers to 260 nanometers;

disposing a target surface in the path of at least a portion of said electromagnetic radiation in such a manner that at least a portion of said target surface will be thereby illuminated; and interposing in the path of at least a portion of said electromagnetic radiation between said target surface and said source a shaped article comprising a fluoropolymer composition exhibiting an absorbance/micrometer $\leq 1$ at wavelengths in the range of 150 to 260 nm and a heat of fusion of <1 J/g a source of electromagnetic radiation such as a lamp (such as a mercury or mercury-xenon lamp, a deuterium lamp or other gas discharge lamp of either the sealed or flowing gas type), an excimer lamp such as produces 172 nm radiation or other lamps), a laser (such as the excimer gas discharge lasers which produce 248 nm electromagnetic radiation from KrF gas, 193 nm radiation from ArF gas or 157 nm from F2 gas, or frequency up converted as by non linear optical processes of laser whose emission in in the ultraviolet, visible or infrared), a black body light source at a temperature of at least 2000 degrees kelvin, an example of such a black body light source being a laser plasma light source where by a high powered laser is focused to a small size onto a metal, ceramic or gas target, and a plasma is formed as for example in the samarium laser plasma light source whereby a black body temperature on the order of 250,000 degrees Kelvin is achieved, and black body radiation from the infrared to the x-ray region can be produced, LPLS light sources are discussed in greater detail in R. H. French, "Laser-Plasma Sourced, Temperature Dependent VUV Spectrophotometer Using Dispersive Analysis", *Physica Scripta*, 41, 4, 404–8, (1990)) emits radiation in the wavelength range from 150 nm to 260 nm. In a preferred embodiment, the source is an excimer gas discharge laser emitting at 157 nm, 193 nm, or 248 nm, most preferably, 157 nm.

At least a portion of the light emitted from the source is directed to a target surface at least a portion of which will be illuminated by the incident light. In a preferred embodiment, the target surface is to be a photopolymer surface which undergoes light-induced chemical reaction in response the incidence of the radiation. Clariant has just introduced a 157 nm fluoropolymer resist under the name AZ EXP FX 1000P which is likely a hydrofluorocarbon polymer incorporating ring structures for etch stability and protected fluoroalcohol groups for aqueous base solubility.

In the process for manufacturing semiconductor devices, very fine features are etched onto a substrate, typically a silicon wafer. The features are formed on the substrate by electromagnetic radiation which is impinged, imagewise, on a photoresist composition applied to the silicon wafer. Areas of the photoresist composition which are exposed to the electromagnetic radiation change chemically and/or physically to form a latent image which can be processed into an image for semiconductor device fabrication. Positive working photoresist compositions generally are utilized for semiconductor device manufacture.

The photoresist composition typically is applied to the silicon wafer by spin coating. The silicon wafer may have various other layers applied to it in additional processing steps. Examples of such additional layers such as are known in the art include but are not limited toa hard mask layer, typically of silicon dioxide or silicon nitride, and an antireflective layer. Typically the thickness of the resist layer is sufficient to resist the dry chemical etch processes used in transferring a pattern to the silicon wafer.

A photoresist is typically comprised of a polymer, a spin coating solvent and at least one photoactive component. The photoresists can either be positive-working or negative-working. Positive-working photoresists are preferred. These photoresists can optionally comprise dissolution inhibitors and/or other additional components such as are commonly employed in the art. Examples of additional components include but are not limited to, resolution enhancers, adhesion promoters, residue reducers, coating aids, plasticizers, and $T_g$ (glass transition temperature) modifiers Various polymer products for photoresist compositions have been described in *Introduction to Microlithographyv Second Edition* by L. F. Thompson, C. G. Willson, and M. J. Bowden, American Chemical Society, Washington, D.C., 1994.

The photoresist composition generally comprises a film forming polymer which may be photoactive and a photosensitive composition that contains one or more photoactive components. Upon exposure to electromagnetic radiation (e.g., UV light), the photoactive component acts to change the rheological state, solubility, surface characteristics, refractive index, color, optical characteristics or other such physical or chemical characteristics of the photoresist composition.

Shorter wavelengths correspond to higher resolution.

Imagewise Exposure

The photoresist compositions suitable for use in the process of the instant invention are sensitive in the ultraviolet region of the electromagnetic spectrum and especially to those wavelengths $\leq 365$ nm. Imagewise exposure of the resist compositions of this invention can be done at many different UV wavelengths including, but not limited to, 365 nm, 248 nm, 193 nm, 157 nm, and lower wavelengths. Imagewise exposure is preferably done with ultraviolet light of 248 nm, 193 nm, 157 nm, or lower wavelengths, more preferably it is done with ultraviolet light of 193 nm, 157 nm, or lower wavelengths, and most preferably, it is done with ultraviolet light of 157 nm or lower wavelengths. Imagewise exposure can either be done digitally with a laser or equivalent device or non-digitally with use of a photomask. Suitable laser devices for imaging of the compositions of this invention include, but are not limited to, an argon-fluorine excimer laser with UV output at 193 nm, a krypton-fluorine excimer laser with UV output at 248 nm, and a fluorine (F2) laser with output at 157 nm. These excimer lasers could be used for digital imaging, but they are also the basis for non-digital imaging using photomasks in optical steppers. Optical steppers for 248 nm can use lamps or KrF excimer laser light sources, and at 193 and 157 nm the light source is an excimer laser, 193 nm=ArF and 157 nm=F2 excimer laser. Since, as discussed supra, use of UV light of lower wavelength for imagewise exposure corresponds to higher resolution the use of a lower wavelength (e.g., 193 nm or 157 nm or lower) is generally preferred over use of a higher wavelength (e.g., 248 nm or higher).

Development

The polymers suitable for use in the present invention can be formulated as a positive resist wherein the areas exposed to UV light become sufficiently acidic to be selectively washed out with aqueous base. Sufficient acidity is imparted to the copolymers by acid or protected acid (which can be 100% in protected form prior to exposure provided deprotection occurs during exposure to afford sufficient free acid to provide for development) such that aqueous development is possible using a basic developer such as sodium hydroxide solution, potassium hydroxide solution, or tetramethylammonium hydroxide solution. In this invention, a given copolymer for aqueous processability (aqueous development) in use is typically a carboxylic acid-containing and/or fluoroalcohol-containing copolymer (after exposure) containing at least one free carboxylic acid group and/or fluoroalcohol group. The level of acid groups (e.g., free carboxylic acid or fluoroalcohol groups) is determined for a given composition by optimizing the amount needed for good development in aqueous alkaline developer.

When an aqueous processible photoresist is coated or otherwise applied to a substrate and imagewise exposed to UV light, the copolymer of the photoresist must have sufficient protected acid groups and/or unprotected acid groups so that when exposed to UV the exposed photoresist will become developable in basic solution. In case of a positive-working photoresist layer, the photoresist layer will be removed during development in portions which are exposed to UV radiation but will be substantially unaffected in unexposed portions during development by aqueous alkaline liquids such as wholly aqueous solutions containing 0.262 N tetramethylammonium hydroxide (with development at 25° C. usually for less than or equal to 120 seconds) or 1% sodium carbonate by weight (with development at a temperature of 30° C. usually for less than 2 or equal to 2 minutes). In case of a negative-working photoresist layer, the photoresist layer will be removed during development in portions which are unexposed to UV radiation but will be substantially unaffected in exposed portions during development using either a supercritical fluid or an organic solvent.

Halogenated solvents are preferred and fluorinated solvents are more preferred.

In a further embodiment, the target surface may be an optical sensor which produces an electronic, optical, or chemical signal in response to the incidentradiation such as in the signal or image wise receiver in an optical, electooptical or electronic detector used in time based, wavelength based or spatially resolved optical communications systems. In these cases the electromagnetic radiation incident on the target surface, and its time variation, spatial variation and/or its wavelength (spectral) variations can be used to encode information which can then be decoded at the detector. In another embodiment, the target surface may be a electrooptical receptor of the type used for light to energy conversion. In another embodiment, the target surface may be a specimen undergoing microscopic examination in the wavelength range of 150–260 nm. In yet another embodiment, the target surface may be a luminescent surface caused to luminesce upon incidence of the 150–260 nm radiation employed in the method of the invention such as in a imaging system used as an optical imaging display. In another embodiment, the target surface may be a specimen undergoing materials processing, such as laser ablation, laser trimming laser melting, laser marking in the wavelength range from 150 nm to 260 nm, According to the method of the invention, a shaped article comprising a transparent fluoropolymer composition as hereinbelow described, is interposed between the light source and the target. In one embodiment of the method of the invention the fluoropolymer composition of the invention is employed in an adhesive. In another embodiment of the method, the fluoropolymer composition is employed as a coating or an element to provent the outgassing under irradiation of dissimilar materials in the system so as to reduce optical contamination by more optically absorbing materials. In another embodiment the adhesive-like material is used as a coating or element or so as to capture and immobilize particulate contaminants, to avoid their further migration and deposition in the system. In another embodiment the fluoropolymer composition of the invention is employed as a coating on a non optical element (such as a support structure in an optical instrument), an optical element (such as a mirror, a lens, a beam splitter, a tuned etalon, a detetecor, a pellicle). In a further embodiment, the fluoropolymer composition is itself a shaped article such as a lens or other optical element (such as a mirror, a lens, a beam splitter, a tuned etalon, a detetecor, a pellicle,) or non optical component (such as a support structure in an optical instrument). In the most preferred embodiment the fluoropolymer composition is in the form of a pellicle, a free standing membrane mounted on a frame (which can be metallic, glass, polymer or other material) which is attached (adhesively or using other methods such as magnetism) to onto the surface of a photomask employed in a photolithographic process conducted in the wavelength region from 150 nm to 260 nm. More preferably, the photolithographic process employs a laser emitting radiation at 157 nm, 193 nm, or 248 nm. Most preferably, the photolithographic process employs a laser emitting 157 nm radiation.

Further provided in the present invention is an apparatus comprising an activateable source of electromagnetic radiation in the wavelength range of 150–260 nanometers; and a shaped article comprising the fluoropolymer composition of the invention exhibiting an absorbance $(\mu m^{-1}) \leq 1$ at wavelengths from 150 to 260 nm and a heat of fusion of <1 J/g In the apparatus of the invention is employed an activateable light source of the type described hereinabove as suitable for use in the method of the invention. By "activateable" is meant that the light source may be, in conventional terms, "on" or "off" but if in the "off" state may be turned on by conventional means. This light source may also have multiple wavelengths (as is used in wavelength division multiplexing in optical communications) through the use of lamps or multiple lasers of different wavelengths. Thus encompassed within the apparatus of the invention is a light source which may be "off." when so desired, as when the apparatus is not being used, or is being shipped. However, the light source of the invention can be activated—that is, turned "on"—when it is desired to use it as, for example, in the method of the present invention. When turned "on" or activated, the light source emits electromagnetic radiation in the wavelength range from 150 nm–260 nm. Light sources suitable for use in the apparatus of the invention include a lamp (such as a mercury or mercury-xenon lamp, a deuterium lamp or other gas discharge lamp of either the sealed or flowing gas type), an excimer lamp such as produces 172 nm radiation or other lamps), a laser (such as the excimer gas discharge lasers which produce 248 nm electromagnetic radiation from KrF gas, 193 nm radiation from ArF gas or 157 nm from F2 gas, or frequency up converterd as by non linear optical processes of laser whose emission is the ultraviolet, visible or infrared), a black body light source at a temperature of at least 2000 degrees kelvin, an example of such a black body light source being a laser plasma light source where by a high powered laser is focused to a small size onto a metal, ceramic or gas target, and a plasma is formed as for example in the samarium laser plasma light source whereby a black body temperature on the order of 250,000 degrees Kelvin is achieved, and black body radiation from the infrared to the x-ray region can be produced) which emits radiation in the wavelength range from 150 nm to 260 nm. In a preferred embodiment, the source is a excimer gas discharge laser emitting at 157 nm, 193 nm, or 248 nm, most preferably, 157 nm.

Further employed in the apparatus of the invention is a shaped article comprising the fluoropolymer of the invention. In the apparatus of the invention, the shaped article is disposed to lie within the path of electromagnetic radiation emitted from the source when the source is activated or "turned on." In one embodiment of the apparatus of the invention the shaped article employs the fluoropolymer composition of the invention in an adhesive. In another embodiment the fluoropolymer composition is employed as a coating on an optical or non-optical element. In a further embodiment, the fluoropolymer composition is itself formed into a shaped article such as a lens or other optical component. In the most preferred embodiment the fluoropolymer composition is in the form of a pellicle, a protective film typically 0.6 to 1 micron thick that is mounted on a frame that is attached in turn to the surface of a photomask employed in a photolithographic process conducted in the wavelength region from 150 nm to 260 nm.

While one of skill in the art will appreciate that the method of use contemplated for the apparatus of the invention necessarily comprises a target surface of some sort, the apparatus of the invention need not encompass a target surface. For example, the apparatus of the invention could be employed as a portable or transportable optical irradiation system with a light source and a set of optical components which could be used on a variety of target surfaces in several locations.

Pellicle film thickness can be optimized such that the pellicle will exhibit a thin film interference with a maximum in the transmission spectrum at the desired lithographic wavelength. The spectral transmission maximum of a properly tuned etalon pellicle film occurs where the spectral reflectance of the pellicle film exhibits a minimum.

Polymers suitable for the practice of the invention exhibit very low absorbance/micron, at least <1, preferably <0.5, more preferably <0.1, and most preferably <0.01. Those which further exhibit values of the index of refraction which match the index of adjacent optical elements have important uses antireflective index matching materials and optically clear index matching adhesives, those which exhibit intermediate values of the index of refraction between those of an optical element and either the ambient (with an index of 1 for example) or a second adjacent element of a different index of refraction have important applications as anti-reflection coatings and those have a low value of the index of refractions below 1.8, or preferably below 1.6 or more preferably below 1.45 have very important applications as multiplayer anti-reflection coatings. Such polymers can be used to reduce the light reflected from the surface of a transparent substrate of a relatively higher index of refraction. This decrease in the reflected light, leads to a concomitant increase in the light transmitted through the transparent substrate material.

EXAMPLES 1–8 AND COMPARATIVE EXAMPLES 1–6

Figure 3:
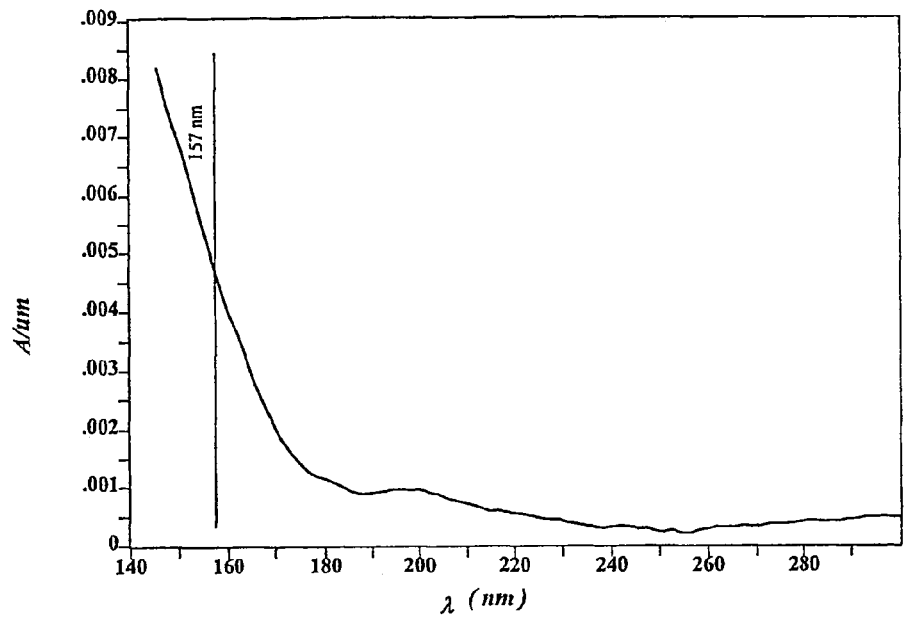
FIG. 3 describes the absorbance in units of inverse micrometers for HCF$_2$O(CF$_2$O)$_n$(CF$_2$CF$_2$O)$_m$CF$_2$H H-Galden™ ZT 85 versus wavelength lambda ($\lambda$) in units of nanometers.
Figure 4:
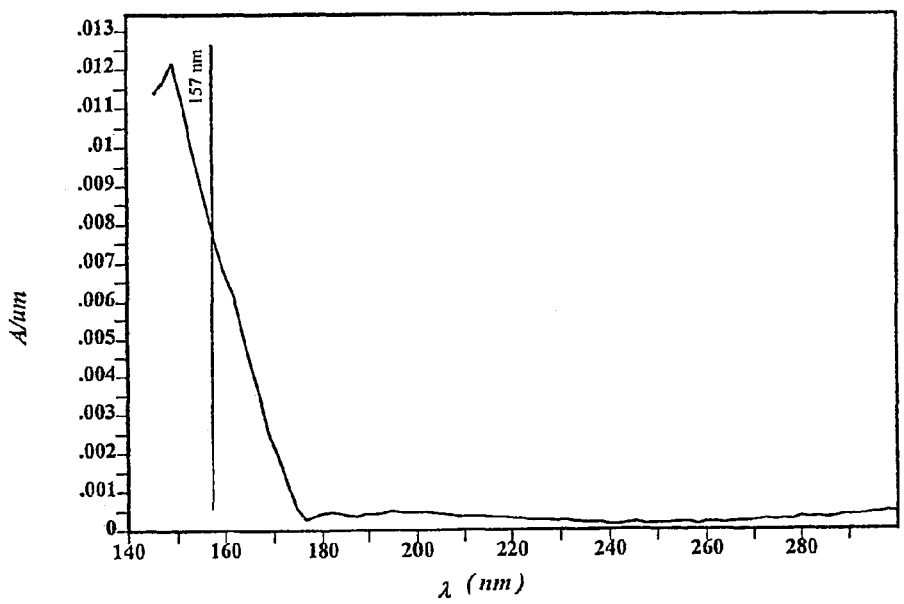
FIG. 4 describes the absorbance in units of inverse micrometers for CF$_3$CF$_2$CF$_2$OCFHCF$_3$ Freon™ E1 versus wavelength lambda ($\lambda$) in units of nanometers.
Figure 5:
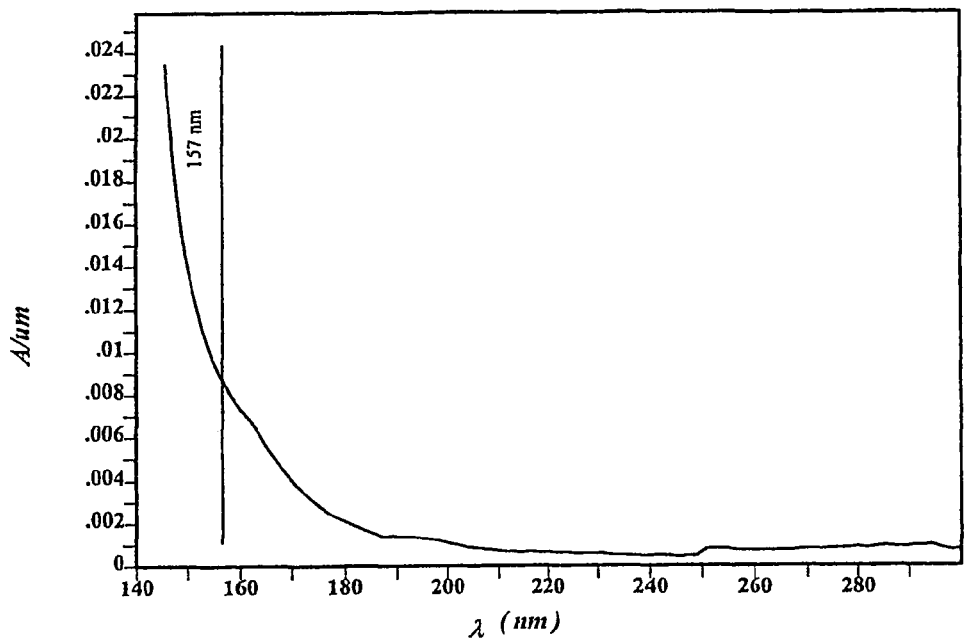
FIG. 5 describes the absorbance in units of inverse micrometers for HCF$_2$O(CF$_2$O)$_n$(CF$_2$CF$_2$O)$_m$CF$_2$H H-Galden™ ZT 130 versus wavelength lambda ($\lambda$) in units of nanometers.
Figure 6:
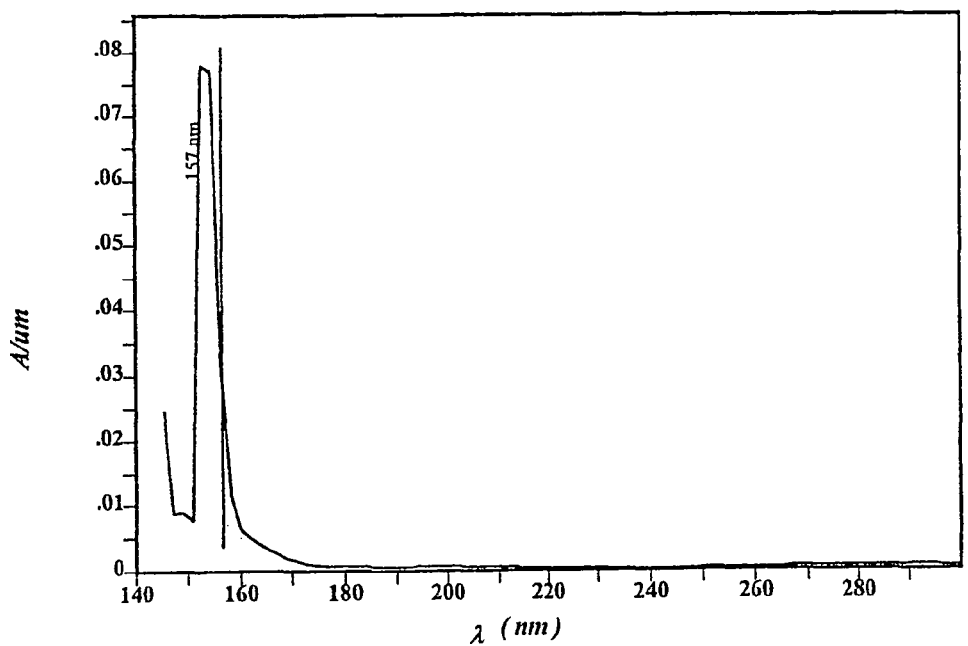
FIG. 6 describes the absorbance in units of inverse micrometers for ~C$_8$F$_{18}$ Performance Fluid™ 5080 versus wavelength lambda ($\lambda$) in units of nanometers. Measurement saturated below 154 nm.
Figure 7:
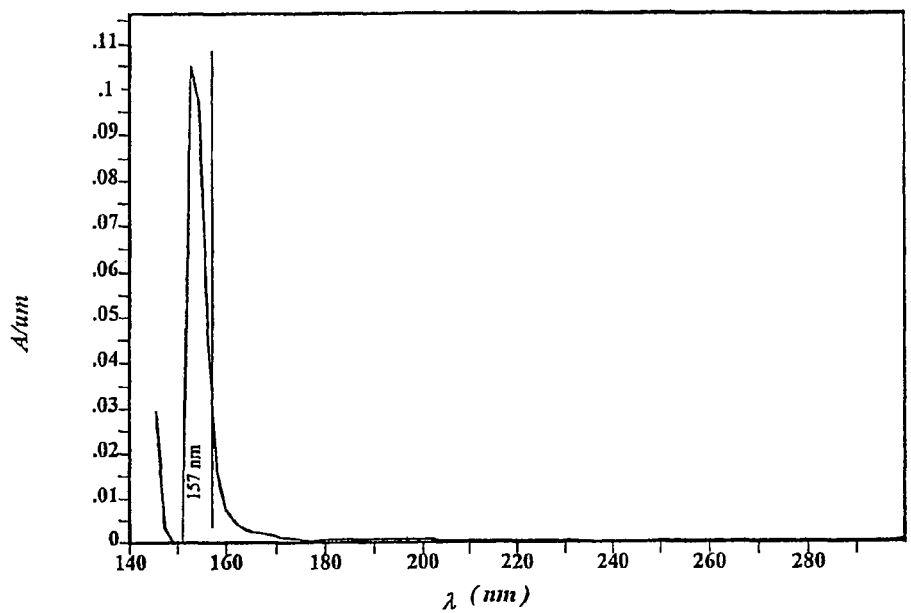
FIG. 7 describes the absorbance in units of inverse micrometers for ~Perfluoro(butyltetrahydrofuran) Fluorinert™ FC-75 versus wavelength lambda ($\lambda$) in units of nanometers. Measurement saturated below 154 nm.
Figure 8:
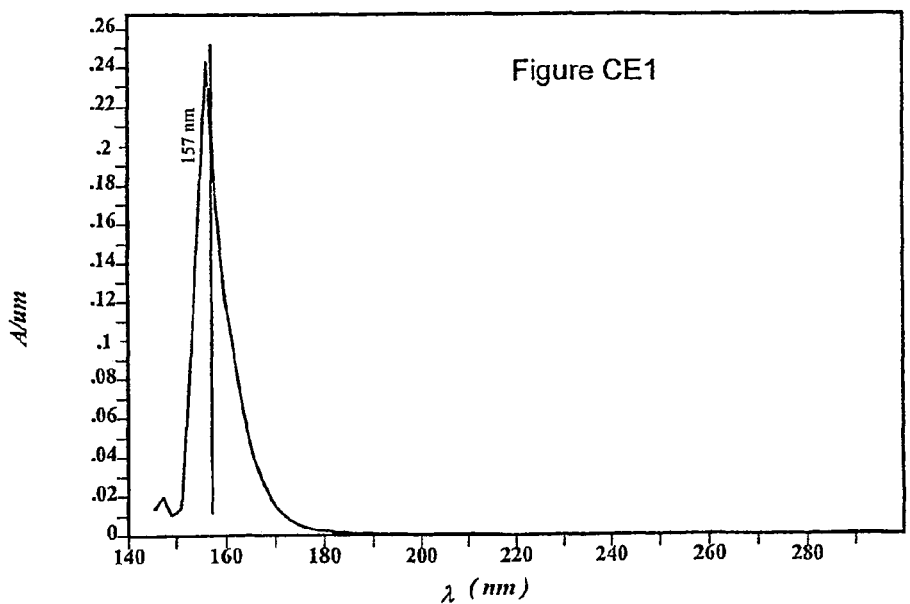
FIG. 8 describes the absorbance in units of inverse micrometers for ~N(CF$_2$CF$_2$CF$_2$CF$_3$)$_3$ Fluorinert™ FC40 versus wavelength lambda ($\lambda$) in units of nanometers. Measurement saturated below 155 nm.
Figure 9:
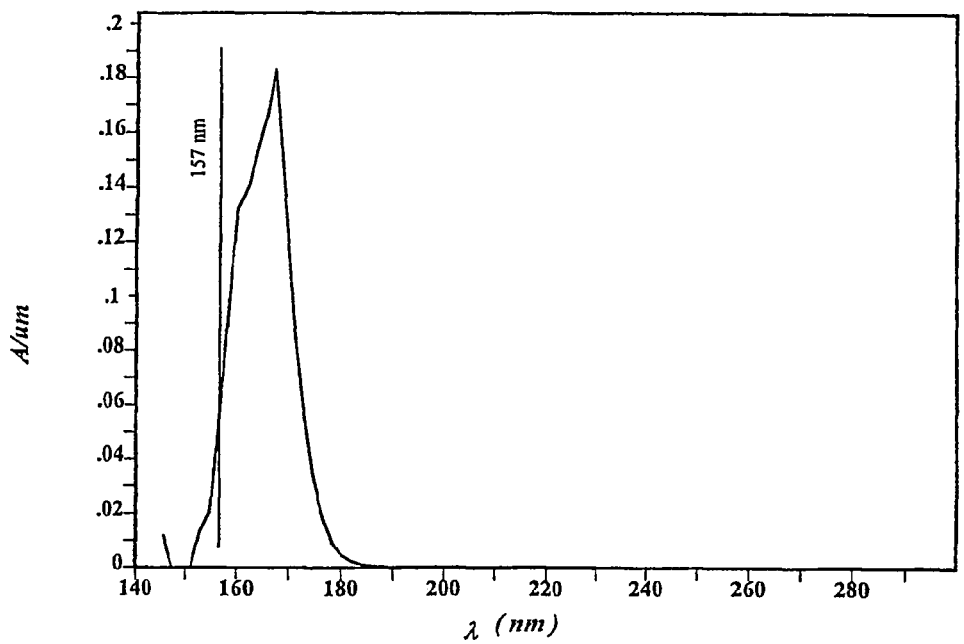
FIG. 9 describes the absorbance in units of inverse micrometers for CF$_3$CF(CF$_3$)CF(OC$_2$H$_5$)CF$_2$CF$_2$CF$_3$ NOVEC™ HFE-7500 versus wavelength lambda ($\lambda$) in units of nanometers. Measurement saturated below 167 nm.
Figure 10:
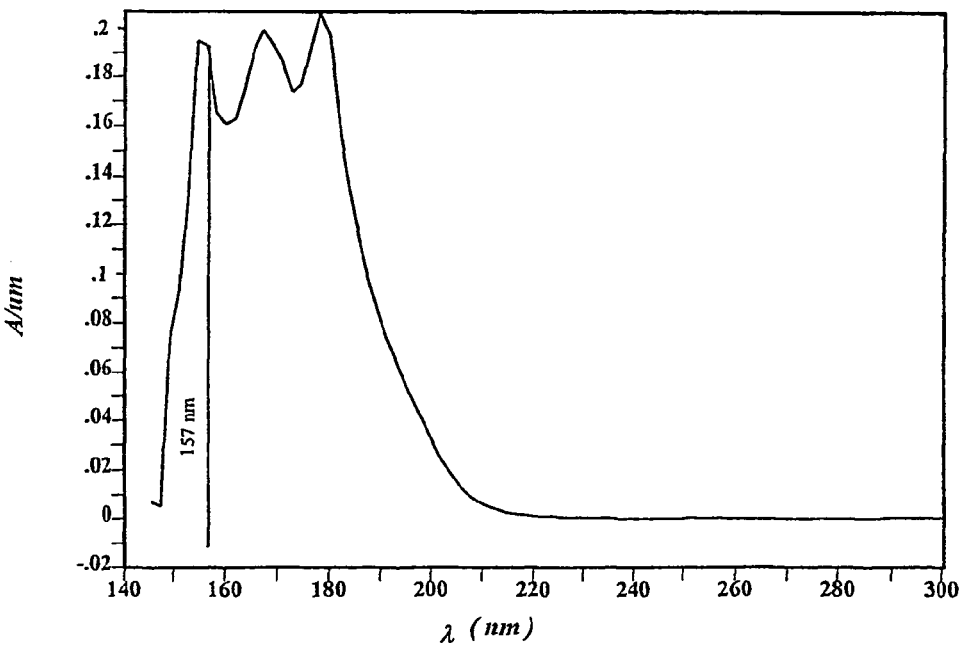
FIG. 10 describes the absorbance in units of inverse micrometers for Hexafluoropropylene/Propylene Cyclic Dimer versus wavelength lambda ($\lambda$) in units of nanometers. Measurement saturated below 180 nm.
Figure 11:
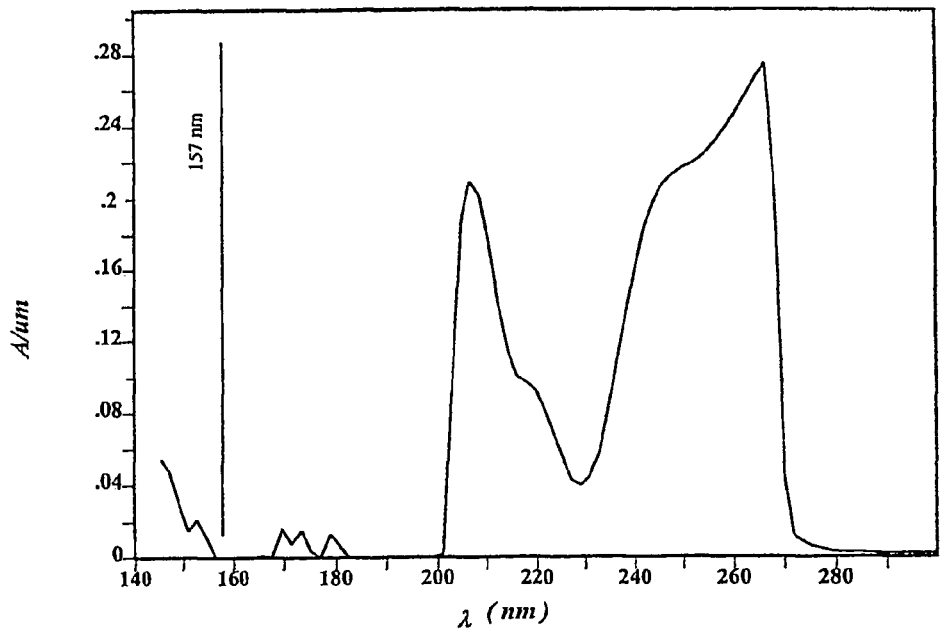
FIG. 11 describes the absorbance in units of inverse micrometers for hexafluorobenzene versus wavelength lambda ($\lambda$) in units of nanometers. Measurement saturated below 266 nm.
Figure 12:
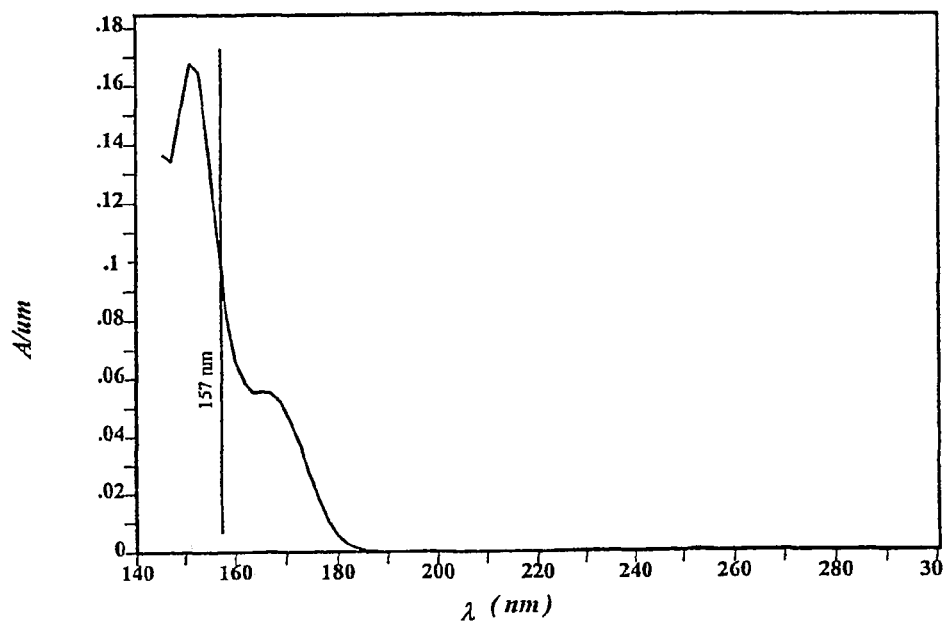
FIG. 12 describes the absorbance in units of inverse micrometers for Vertrel 245 versus wavelength lambda ($\lambda$) in units of nanometers. Measurement saturated below 152 nm.
Figure 13:
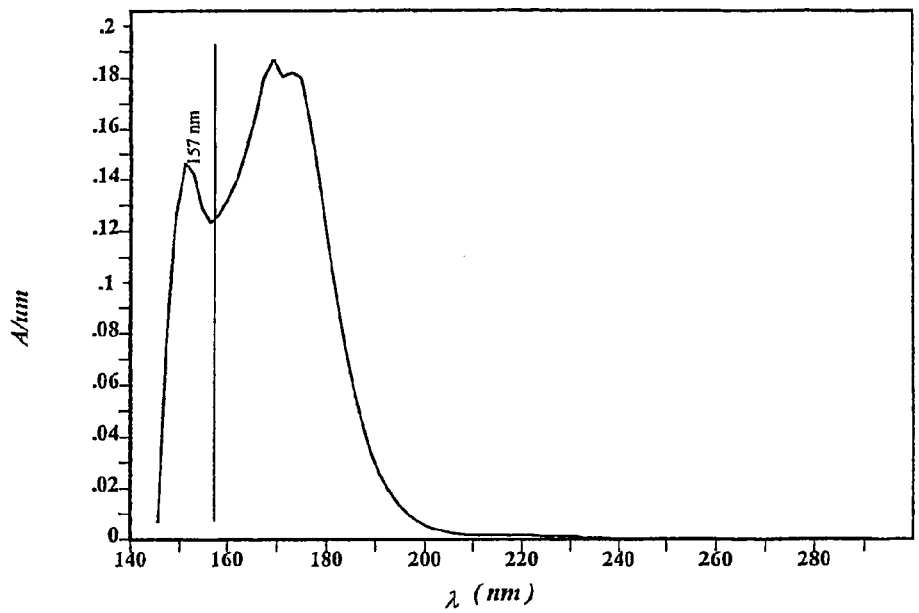
FIG. 13 describes the absorbance in units of inverse micrometers for 1,1,2,2-Tetrafluorocyclobutane versus wavelength lambda ($\lambda$) in units of nanometers. Measurement saturated below 175 nm.
Figure 14:
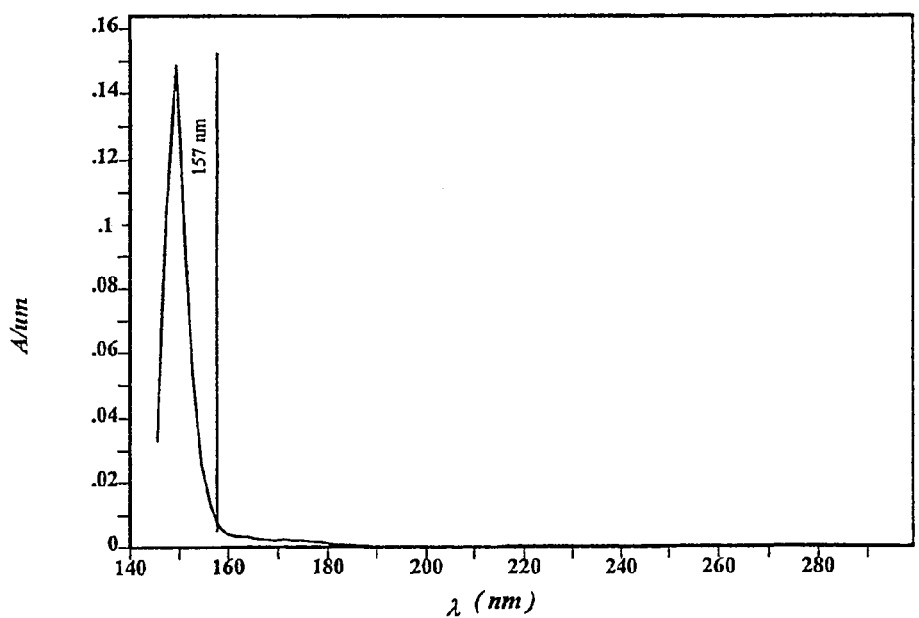
FIG. 14 describes the absorbance in units of inverse micrometers for 1-ethoxy-1,1,2,2-tetrafluoroethane versus wavelength lambda ($\lambda$) in units of nanometers. Measurement saturated below 148 nm.

The transmission measurements of the fluid samples listed in Table 1 were made using a Harrick Scientific Corp. (Harrick Scientific Corporation Ossining, N.Y.) Demountable Liquid Cell model DLC-M13 as shown in FIG. 3. The DLC-M13 was mounted in a VUV-Vase model VU-302 spectroscopic ellipsometer (J. A. Woolman Co., Inc. Lincoln, Neb.). The liquid specimen to be tested was held in a cell formed between parallel CaF2 windows by insertion of a Teflon® ring between the windows. To account for the effect of multiple reflections, Teflon® rings of 6 and 25 micrometer thickness were used, providing two optical path lengths through two aliquots of the same sample. While charging the cell, care was taken to avoid bubbles in the 8 mm diameter window aperture.

The optical absorbance, A ($\mu m^{-1}$) as defined in Equation 1, is the base 10 logarithm of the ratio of the transmission of the $CaF_2$ windows at the test wavelength divided by the transmission at that wavelength of the test sample (windows plus experimental specimen) divided by the thickness (t) of or optical path length through the test specimen $$A(\mu m^{-1}) = A/um = \frac{\text{Log}_{10}[T_{substrate}/T_{sample}]}{t}. \qquad \text{Equation 1}$$

The spectral transmission was measured at both cell thicknesses ($t_1$ and $t_2$) and the incremental decrease in transmission ($T_1$ and $T_2$) with the increase in the sample's optical path length provided the optical absorbance/micrometer using Equation 2.

$$A/\mu m = \frac{\log_{10}(T_i) - \log_{10}(T_2)}{t_2 - t_1}. \qquad \text{Equation 2}$$

A transmission difference of ~0.1% is near the limit of the measurement method. In such a case, a thicker sample, with a longer path length, is required to keep the measured transmission drop larger than the instrument's sensitivity.

Results at 157 nm, 193 nm, and 248 nm are tabulated in Table 1. The corresponding spectrum is found in the figure with the corresponding number.

TABLE 1

| Ex | Solvent | B. P. | A/μm @ 157 nm | A/μm @ 193 nm | A/μm @ 248 nm |
|---|---|---|---|---|---|
| 1 | $CF_3CFHCFHCF_2CF_3$ Vertrel ™ XF | 55° C. | 0.0026 | −0.007 | 0.0002 |
| 2 | $CF_3CH_2CF_2CH_3$ Solkane ™ 365 mfc | 40° C. | 0.0033 | 0.0003 | −0.005 |
| 3 | $HCF_2O(CF_2O)_n(CF_2CF_2O)_mCF_2H$ H-Galden ™ ZT 85 | 85° C. | 0.0037 | 0.0009 | 0.0002 |
| 4 | $CF_3CF_2CF_2OCFHCF_3$ Freon ™ E1 | 41° C. | 0.0076 | 0.0004 | 0.0001 |
| 5 | $HCF_2O(CF_2O)_n(CF_2CF_2O)_mCF_2H$ H-Galden ™ ZT 130 | 130° C. | 0.0093 | 0.0013 | 0.0005 |
| 6 | ~$C_8F_{18}$ Performance Fluid ™ 5080 | 102° C. | 0.029 | 0.0006 | 0.0002 |
| 7 | ~Perfluoro(butyltetrahydrofuran) Fluorinert ™ FC-75 | 102° C. | 0.03 | 0.0007 | 0.0003 |
| CE 1 | ~$N(CF_2CF_2CF_2CF_3)_3$ Fluorinert ™ FC-40 | 155° C. | 0.21 | 0.0007 | 0.0001 |
| CE 2 | $CF_3CF(CF_3)CF(OC_2H_5)CF_2CF_2CF_3$ NOVEC ™ HFE-7500 | 130° C. | >0.18 | 0.0004 | 0.0001 |
| CE 3 | Hexafluoropropylene/Propylene Cyclic Dimer | 83–9° C. | >0.2 | 0.064 | 0.0002 |
| CE 4 | Hexafluorobenzene | 80.5° C. | >0.3 | >0.2 | 0.21 |
| CE 5 | Vertrel 245 | | 0.10 | 0.0001 | 0.0003 |
| CE 6 | 1,1,2,2-Tetrafluorocyclobutane | | >0.18 | 0.018 | 0.0003 |
| 8 | 1-ethoxy-1,1,2,2-tetrafluoroethane | | 0.006 | 0.0001 | 0.0003 |

EXAMPLE 9

A 400 ml stainless steel autoclave was loaded with 0.2 g Vazo® 56 WSP [2,2'-azobis(2-amidinopropane)dihydrochloride] and 200 ml of deionized water containing 0.1 g of $F(CF_2)_{\sim 6-8}(CH_2)_3NH_3Cl$. The autoclave was chilled, evacuated, and further loaded with 80 g of $(CF_3)_2C{=}CH_2$ (HFIB) and 25 g of $CH_2{=}CHF$ (VF). Agitating for 8 hours at 70°

C. gave a mixture of suspended white solids and milky emulsion that was broken by freezing and thawing. This gave a small volume of liquid that was filtered and a large residual lump that was cut into smaller chunks using shears. The product of two such runs was combined and washed in a Waring blender first with 200 ml of methyl alcohol, a second time with 150 ml of methyl alcohol, and a third time with 150 ml of methyl alcohol, capturing the product after each wash with a Buchner filter. The poly(HFIB/VF) product of four runs total was dried for 6 days under pump vacuum. This gave 267 g of poly(HFIB/VF) as a fine white powder.

| | | |
|---|---|---|
| Calculated. for $(C_4F_6H_2)_1(C_2H_3F)_1$: | 34.30% C | 2.40% H |
| Found: | 34.26% C | 2.66% H |
| Inherent viscosity, THF, 25° C. | 0.147 dL/g | |
| DSC, 2nd heat, 10° C./min, N2 | Tg = 67° C. | |

A solution was made by agitating 2 g of the poly(HFIB/VF) so prepared with 18 g of Solkane® 365 mfc (CF3CH2CF2CH3). Adding 0.5 g of chromatographic alumina and 0.5 g of chromatographic silica gel and filtering through a 0.45 micron PTFE syringe filter (Whatman® Autovial® 0.45 micron PTFE membrane) gave a clear colorless filtrate.

The absorbance/micron was measured for films formed from the thus prepared polymer solution by spin-coating on to CaF2 substrates using standard methods in the art, as described in R. H. French, R. C. Wheland, D. J. Jones, J. N. Hilfiker, R. A. Synowicki, F. C. Zumsteg, J. Feldman, A. E. Feiring, "Fluoropolymers for 157 nm Lithography: Optical Properties from VUV Absorbance and Ellipsometry Measurements", *Optical Microlithography XIII*, SPIE Vol. 4000, edited by C. J. Progler, 1491–1502 (2000). The VUV transmission of the CaF2 substrates and the polymer films on the CaF2 substrates were measured using a VUV spectrophotometer using a laser plasma light source, a sample chamber capable of both transmission and reflectance measurements, a 1 meter monochromator and a sodium salicylate phosphor coated 1024 element photodiode detector. This is discussed in greater detail in R. H. French, "Laser-Plasma Sourced, Temperature Dependent VUV Spectrophotometer Using Dispersive Analysis", *Physica Scripta*, 41, 4, 404 8, (1990). The film thickness was determined using a Filmetrics (Filmetrics Inc., San Diego, Calif. model F20 thin film measurement system. Using Equation 1, the spectral transmission and the film thickness, the values of the absorbance/micron for the polymers were calculated from 145 nm to longer wavelengths, including at 157, 193, and 248 nm.

The prepared solution was spin coated onto a CaF$_2$ substrate at a spin speed of 1500 rpm for a period of 60 seconds using a Brewer CEE 100b model Spin Coater (Brewer Science, 2401 Brewer Drive, Rolla, Mo. 65401 USA). The sample was then removed from the spinner and put on the hot plate of the spin coater at 60 degrees centrigrade for a post apply bake. This produced a film of 1986 nm thickness.

After spinning from Solkane® 365 mfc, a solvent with an A/µ=0.0025 and drying at 60° C., the poly(HFIBNF) film had an A/µ=0.079.

COMPARATIVE EXAMPLE 7

A solution was made by agitating 2 g of the poly(HFIB/VF) prepared in Example 9 with 18 g of hexafluorobenzene. Adding 0.5 g of chromatographic alumina and 0.5 g of chromatographic silica gel and filtering through an 0.45 micron PTFE syringe filter (Whatman® Autovial® 0.45 micron PTFE membrane) gave a clear colorless filtrate.

Following the procedures of Example 9:

The solution so prepared was spin coated on to a CaF$_2$ substrate at a spin speed of 6000 rpm for a period of 60 seconds. The sample was then removed from the spin coater and put the spin coater's hot plate at 60 degrees centrigrade for a post apply bake. This produced and produced a film of 2090 nm thickness.

After spinning from hexafluorobenzene, a solvent with an A/µ>>0.3 and drying at 60° C., the poly(HFIBNF) film had an A/µ=0.141.

What is claimed is:

1. A lens formed from a fluoropolymer composition comprising vinyl fluoropolymers and a liquid selected from the group consisting of
   i) cyclic, linear, or branched hydrofluorocarbons having 2 to 10 carbon atoms wherein said hydrofluorocarbon the number of fluorines equals or exceeds the number of hydrogens, no more than two adjacent carbon atoms are bonded to hydrogen, no more than six adjacent carbon atoms are bonded to fluorine, there are no —$CH_2CH_3$ groups, and any rings are five-membered or larger;
   ii) $C_nF_{2n+1}CFHCFHC_mF_{2m+1}$ where n and m run from 1 to 4; and
   iii) $X(CF_2CH_2)_nY$ where n=1 to 5, where X and Y are, independently, H, Cl, or F.

2. The lens of claim 1 wherein the concentration of the liquid is 10% or less by weight.

3. The lens of claim 1 wherein the fluoropolymer is amorphous.

4. The lens of claim 3 wherein the fluoropolymer comprises monomer units derived from perfluoro-2,2-dimethyl-1,3-dioxole or $CX_2$=$CY_2$, where X is —F or —$CF_3$ and Y is H, or a copolymer thereof.

5. The lens of claim 4 wherein the copolymer further comprises up to 25 mole % of one or more monomers $CR^aR^b$=$CR^cR^d$ randomly incorporated thereinto wherein each of $R^a$, $R^b$, and $R^c$ is independently H or F, and wherein $R^d$ is selected from the group consisting of —F, —$CF_3$, —$OR_f$ where $R_f$ is $C_nF_{2n+1}$ with n=1 to 3, and —OH with the proviso that when $R_f$ is —OH, $R^C$ is H.

6. The lens of claim 4 wherein the copolymer further comprises 40 to 60 mole % of one or more monomers $CR^aR^b$=$CR^cR^d$ incorporated thereinto in a non-random approximately alternating fashion wherein each of $R^a$, $R^b$, and $R^c$ is independently H or F, and where $R^d$ is selected from the group consisting of —F, —$CF_3$, —$OR_f$ where $R_f$ is $C_nF_{2n+1}$ with n=1 to 3, and —OH with the proviso that when $R_f$ is —OH, $R^C$ is H.

7. The lens of claim 3 wherein the amorphous fluoropolymer further comprises a homopolymer selected from group A or copolymers from groups B, C, and D wherein
   group A consists of the homopolymer of $CH_2$=$CFCF_3$;
   group B consists of copolymers comprising >25 mole % of monomer units derived from $CF_2$=$CHOR_f$ in combination with monomer units derived from vinylidene fluoride wherein $R_f$ is a linear or branched C1 to C6 fluoroalkyl radical having the formula $C_nF_{2n-y+1}H_y$, wherein the number of hydrogens is less than or equal to the number of fluorines, no more than two adjacent carbons atoms are bonded to hydrogens, and ether oxygen can replace one or more of the carbons providing at least one of the carbons adjacent to any ether oxygen is perfluorinated;

group C consists of copolymers comprising >10 mole % of monomer units derived from $CH_2=CFCF_3$, $CF_2=CHOR_f$, or a mixture thereof in combination with a monomer unit derived from 1,3 perfluorodioxoles wherein $R_f$ is a linear or branched C1 to C6 fluoroalkyl radical having the formula $C_nF_{2n}C_nF_{2n-y+1}H_y$, wherein the number of hydrogens is less than or equal to the number of fluorines, no more than two adjacent carbons atoms are bonded to hydrogens, and ether oxygen can replace one or more of the carbons providing at least one of the carbons adjacent to any oxygen is perfluorinated, and wherein said 1,3-perfluorodioxole has the structure

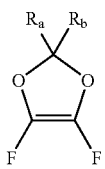

wherein $R^a$ and $R^b$ are independently F or linear $-C_nF_{2n+1}$, optionally substituted by ether oxygen, for which n=1 to 5;

group D consists of copolymers comprising 40 to 60 mole % of monomer units derived from a monomer represented by the formula

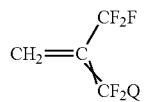

in combination with monomer units derived from vinylidene fluoride and or vinyl fluoride wherein g and Q are independently F (but not both F), H, $R_f$, or $-OR_f$ wherein $R_f$ is a linear or branched C1 to C5 fluoroalkyl radical having the formula $C_nF_{2n-y+1}H_y$, wherein the number of hydrogens is less than or equal to the number of fluorines, no more than two adjacent carbons atoms are bonded to hydrogens and ether oxygen can replace one or more of the carbons providing that at least one of the carbons adjacent to any ether oxygen is perfluorinated.

8. The lens of claim 3 wherein the amorphous fluoropolymer is selected from the group consisting of poly(vinylidene fluoride/hexafluoropropylene), with a molar concentration of VF2 monomer units in the range of 75 to 80%; poly (vinylidene fluoride/perfluorodimethyldioxole), with a molar concentration of VF2 monomer units in the range of 50 to 70%; poly(vinylidene fluoride/perfluoromethylvinyl ether)), with a molar concentration of VF2 monomer units in the range of 60 to 80%; poly(trifluoroethylene/perfluorodimethyldioxole)), with a molar concentration of trifluoroethylene monomer units in the range of 45–55%; poly (hexafluoroisobutylene/vinylfluoride), ), with a molar concentration of hexafluoroisobutylene monomer units in the range of 45–55%; poly(hexafluoroisobutylene/trifluoroethylene), with a molar concentration of hexafluoroisobutylene monomer units in the range of 45–55%; poly[vinylidene fluoride/CH2=C(CF3)CF2OCH(CF3)2], with a molar concentration of VF2 monomer units in the range of 45 to 60%; poly[vinylidene fluoride/CH2=C(CF3)CF2OCF(CF3)2]], with a molar concentration of VF2 monomer units in the range of 45 to 60%; poly[vinylidene fluoride/CF2=CHOCF2CF2H], ], with a molar concentration of VF2 monomer units in the range of 45 to 60%; poly (perfluorodimethyldioxole/CF2=CHOCF2CF2CF2CF3)], with a molar concentration of PDD monomer units in the range of 50 to 80%; poly(CH2=CFCF2); poly(perfluorodimethydioxole/CH2=CFCF3)], with a molar concentration of CH2=CFCF3 monomer units >50%.

9. A method comprising causing a source to emit electromagnetic radiation in the wavelength range from 150 nanometers to 260 nanometers; disposing a target surface in the path of at least a portion of said electromagnetic radiation in such a manner that at least a portion of said target surface will be thereby illuminated; and interposing in the path of at least a portion of said electromagnetic radiation between said target surface and said source a lens comprising a fluoropolymer composition comprising a vinyl fluoropolymer and a liquid said liquid being selected from the group consisting of
  i) cyclic, linear, or branched hydrofluorocarbons having 2 to 10 carbon atoms wherein said hydrofluorocarbon the number of fluorines equals or exceeds the number of hydrogens, no more than two adjacent carbon atoms are bonded to hydrogen, no more than six adjacent carbon atoms are bonded to fluorine, there are no $-CH_2CH_3$ groups, and any rings are five-membered or larger;
  ii) $C_nF_{2n+1}CFHCFHC_mF_{2m+1}$ where n and m run from 1 to 4; and
  iii) $X(CF_2CH_2)_nY$ where n=1 to 5, where X and Y are, independently, H, Cl, or F.

10. The method of claim 9 wherein the concentration of the liquid in said fluoropolymer composition is 10% or less by weight.

11. The method of claim 9 wherein the fluoropolymer is amorphous.

12. The method of claim 11 wherein the fluoropolymer comprises monomer units derived from perfluoro-2,2-dimethyl-1,3-dioxole or $CX_2=CY_2$, where X is $-F$ or $-CF_3$ and Y is H, or a copolymer thereof.

13. The method of claim 12 wherein the copolymer further comprises up to 25 mole % of one or more monomers $CR^aR^b=CR^cR^d$ randomly incorporated thereinto wherein each of $R^a$, $R^b$, and $R^c$ is independently H or F, and wherein $R^d$ is selected from the group consisting of $-F$, $-OF_3$, $-OR_f$ where $R_f$ is $C_nF_{2n+1}$ with n=1 to 3, and $-OH$ with the proviso that when $R_f$ is $-OH$, $R^c$ is H.

14. The method of claim 12 wherein the copolymer further comprises 40 to 60 mole % of one or more monomers $CR^aR^b=CR^cR^d$ incorporated thereinto in a non-random approximately alternating fashion wherein each of $R^a$, $R^b$, and $R^c$ is independently H or F, and where $R^d$ is selected from the group consisting of $-F$, $-CF_3$, $-OR_f$ where $R_f$ is $C_nF_{2n+1}$ with n=1 to 3, and $-OH$ with the proviso that when $R_f$ is $-OH$, $R^c$ is H.

15. The method of claim 11 wherein the amorphous fluoropolymer further comprises a homopolymer selected from group A or copolymers from groups B, C, and D wherein
  group A consists of the homopolymer of $CH_2=CFCF_3$;
  group B consists of copolymers comprising >25 mole % of monomer units derived from $CF_2=CHOR_f$ in combination with monomer units derived from vinylidene fluoride wherein $R_f$ is a linear or branched C1 to C6 fluoroalkyl radical having the formula $C_nF_{2n-y+1}H_y$, wherein the number of hydrogens is less than or equal to the number of fluorines, no more than two adjacent carbons atoms are bonded to hydrogens, and ether oxygen can replace one or more of the carbons providing at least one of the carbons adjacent to any ether oxygen is perfluorinated;

group C consists of copolymers comprising >10 mole % of monomer units derived from $CH_2=CFCF_3$, $CF_2=CHOR_f$, or a mixture thereof in combination with a monomer unit derived from 1,3 perfluorodioxoles wherein $R_f$ is a linear or branched C1 to C6 fluoroalkyl radical having the formula $C_nF_{2n-y}C_nF_{2n-y+1}H_y$, wherein the number of hydrogens is less than or equal to the number of fluorines, no more than two adjacent carbons atoms are bonded to hydrogens, and ether oxygen can replace one or more of the carbons providing at least one of the carbons adjacent to any oxygen is perfluorinated, and wherein said 1,3-perfluorodioxole has the structure

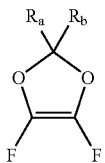

wherein $R^a$ and $R^b$ are independently F or linear $-C_nF_{2n+1}$, optionally substituted by ether oxygen, for which n=1 to 5;

group D consists of copolymers comprising 40 to 60 mole % of monomer units derived from a monomer represented by the formula

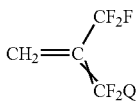

in combination with monomer units derived from vinylidene fluoride and or vinyl fluoride wherein g and Q are independently F (but not both F), H, $R_f$ or $-OR_f$ wherein $R_f$ is a linear or branched C1 to C5 fluoroalkyl radical having the formula $C_nF_{2n-y+1}H_y$ wherein the number of hydrogens is less than or equal to the number of fluorines, no more than two adjacent carbons atoms are bonded to hydrogens and ether oxygen can replace one or more of the carbons providing that at least one of the carbons adjacent to any ether oxygen is perfluorinated.

16. The method of claim 11 wherein the amorphous fluoropolymer is selected from the group consisting of poly(vinylidene fluoride/hexafluoropropylene), with a molar concentration of VF2 monomer units in the range of 75 to 80%; poly(vinylidene fluoride/perfluorodimethyldioxole), with a molar concentration of VF2 monomer units in the range of 50 to 70%; poly(vinylidene fluoride/perfluoromethylvinyl ether)), with a molar concentration of VF2 monomer units in the range of 60 to 80%; poly(trifluoroethylene/perfluorodimethyldioxole)), with a molar concentration of trifluoroethylene monomer units in the range of 45–55%; poly(hexafluoroisobutylene/vinylfluoride)), with a molar concentration of hexafluoroisobutylene monomer units in the range of 45–55%; poly(hexafluoroisobutylene/trifluoroethylene), with a molar concentration of hexafluoroisobutylene monomer units in the range of 45–55%; poly[vinylidene fluoride/CH2=C(CF3)CF2OCH(CF3)2], with a molar concentration of VF2 monomer units in the range of 45 to 60%; poly[vinylidene fluoride/CH2=C(CF3)CF2OCF(CF3)2]], with a molar concentration of VF2 monomer units in the range of 45 to 60%; poly[vinylidene fluoride/CF2=CHOCF2CF2H]], with a molar concentration of VF2 monomer units in the range of 45 to 60%; poly(perfluorodimethyldioxole/CF2=CHOCF2CF2CF2CF3)], with a molar concentration of PDD monomer units in the range of 50 to 80%; poly(CH2=CFCF2); poly(perfluorodimethyldioxole/CH2=CFCF3), ], with a molar concentration of CH2=CFCF3 monomer units >50%.

17. The method of claim 9 wherein said source is a laser emitting 157 nm electromagnetic radiation.

18. The method of claim 9 wherein said target surface comprises a photopolymer.

19. The method of claim 9 wherein said fluoropolymer composition is a coating disposed upon the surface of said lens.

20. An apparatus comprising an activateable source of electromagnetic radiation in the wavelength range of 150–260 nanometers; and a lens comprising fluoropolymer composition comprising a vinyl fluoropolymer and a liquid said liquid being selected from the group consisting of
  i) cyclic, linear, or branched hydrofluorocarbons having 2 to 10 carbon atoms wherein said hydrofluorocarbon the number of fluorines equals or exceeds the number of hydrogens, no more than two adjacent carbon atoms are bonded to hydrogen, no more than six adjacent carbon atoms are bonded to fluorine, there are no $-CH_2CH_3$ groups, and any rings are five-membered or larger;
  ii) $C_nF_{2n+1}CFHCFHC_mF_{2m+1}$ where n and m run from 1 to 4; and
  iii) $X(CF_2CH_2)_nY$ where n=1 to 5, where X and Y are, independently, H, Cl, or F.

21. The apparatus of claim 20 wherein the concentration of the liquid in said fluoropolymer composition is 10% or less by weight.

22. The apparatus of claim 20 wherein the fluoropolymer is amorphous.

23. The apparatus of claim 22 wherein the fluoropolymer comprises monomer units derived from perfluoro-2,2-dimethyl-1,3-dioxole or $CX_2=CY_2$, where X is $-F$ or $-CF_3$ and Y is H, or a copolymer thereof.

24. The apparatus of claim 23 wherein the copolymer further comprises up to 25 mole % of one or more monomers $CR^aR^b=CR^cR^d$ randomly incorporated thereinto wherein each of $R^a$, $R^b$, and $R^c$ is independently H or F, and wherein $R^d$ is selected from the group consisting of $-F$, $-CF_3$, $-OR_f$ where $R_f$ is $C_nF_{2n+1}$ with n=1 to 3, and $-OH$ with the proviso that when $R_f$ is $-OH$, $R^C$ is H.

25. The apparatus of claim 23 wherein the copolymer further comprises 40 to 60 mole % of one or more monomers $CR^aR^b=CR^cR^d$ incorporated thereinto in a non-random approximately alternating fashion wherein each of $R^a$, $R^b$, and $R^c$ is independently H or F, and where $R^d$ is selected from the group consisting of $-F$, $-CF_3$, $-OR_f$ where $R_f$ is $C_nF_{2n+1}$ with n=1 to 3, and $-OH$ with the proviso that when $R_f$ is $-OH$, $R^C$ is H.

26. The apparatus of claim 22 wherein the amorphous fluoropolymer further comprises a homopolymer selected from group A or copolymers from groups B, C, and D wherein
  group A consists of the homopolymer of $CH_2=CFCF_3$;
  group B consists of copolymers comprising >25 mole % of monomer units derived from $CF_2=CHOR_f$ in combination with monomer units derived from vinylidene fluoride wherein $R_f$ is a linear or branched C1 to C6 fluoroalkyl radical having the formula $C_nF_{2n-y+1}H_y$, wherein the number of hydrogens is less than or equal to the number of fluorines, no more than two adjacent carbons atoms are bonded to hydrogens, and ether oxygen can replace one or more of the carbons providing at least one of the carbons adjacent to any ether oxygen is perfluorinated;

group C consists of copolymers comprising >10 mole % of monomer units derived from $CH_2=CFCF_3$, $CF_2=CHOR_f$, or a mixture thereof in combination with a monomer unit derived from 1,3 perfluorodioxoles wherein $R_f$ is a linear or branched C1 to C6 fluoroalkyl radical having the formula $C_nF_{2n}$-$C_nF_{2n-y+1}H_y$, wherein the number of hydrogens is less than or equal to the number of fluorines, no more than two adjacent carbons atoms are bonded to hydrogens, and ether oxygen can replace one or more of the carbons providing at least one of the carbons adjacent to any oxygen is perfluorinated, and wherein said 1,3-perfluorodioxole has the structure

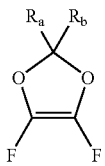

wherein $R^a$ and $R^b$ are independently F or linear —$C_nF_{2n+1}$, optionally substituted by ether oxygen, for which n=1 to 5;

group D consists of copolymers comprising 40 to 60 mole % of monomer units derived from a monomer represented by the formula

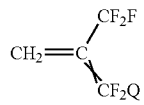

in combination with monomer units derived from vinylidene fluoride and or vinyl fluoride wherein g and Q are independently F (but not both F), H, $R_f$, or —$OR_f$ wherein $R_f$ is a linear or branched C1 to C5 fluoroalkyl radical having the formula $C_nF_{2n-y+1}H_y$ wherein the number of hydrogens is less than or equal to the number of fluorines, no more than two adjacent carbons atoms are bonded to hydrogens and ether oxygen can replace one or more of the carbons providing that at least one of the carbons adjacent to any ether oxygen is perfluorinated.

27. The apparatus of claim 22 wherein the amorphous fluoropolymer is selected from the group consisting of poly(vinylidene fluoride/hexafluoropropylene), with a molar concentration of VF2 monomer units in the range of 75 to 80%; poly(vinylidene fluoride/perfluorodimethyldioxole), with a molar concentration of VF2 monomer units in the range of 50 to 70%; poly(vinylidene fluoride/perfluoromethylvinyl ether)), with a molar concentration of VF2 monomer units in the range of 60 to 80%; poly(trifluoroethylene/perfluorodimethyldioxole)), with a molar concentration of trifluoroethylene monomer units in the range of 45–55%; poly(hexafluoroisobutylene/vinylfluoride)), with a molar concentration of hexafluoroisobutylene monomer units in the range of 45–55%; poly(hexafluoroisobutylene/trifluoroethylene), with a molar concentration of hexafluoroisobutylene monomer units in the range of 45–55%; poly[vinylidene fluoride/CH2=C(CF3)CF2OCH(CF3)2], with a molar concentration of VF2 monomer units in the range of 45 to 60%; poly[vinylidene fluoride/CH2=C(CF3)CF2OCF(CF3)2]], with a molar concentration of VF2 monomer units in the range of 45 to 60%; poly[vinylidene fluoride/CF2=CHOCF2CF2H]], with a molar concentration of VF2 monomer units in the range of 45 to 60%; poly(perfluorodimethyldioxole/CF2=CHOCF2CF2CF2CF3)], with a molar concentration of PDD monomer units in the range of 50 to 80%; poly(CH2=CFCF2); poly(perfluorodimethydioxole/CH2=CFCF3)], with a molar concentration of CH2=CFCF3 monomer units >50%.

28. The apparatus of claim 20 wherein said activateable light source is a laser emitting 157 nm electromagnetic radiation.

29. The apparatus of claim 20 further comprising a target surface.

30. The apparatus of claim 28 wherein said target surface comprises a photopolymer.

31. The apparatus of claim 20 wherein said fluoropolymer composition is a coating disposed upon the surface of said lens.

32. The apparatus of claim 20 further comprising an adhesive composition comprising said fluoropolymer composition.

* * * * *